(12) United States Patent
Christian et al.

(10) Patent No.: US 10,983,982 B2
(45) Date of Patent: Apr. 20, 2021

(54) METHOD AND SYSTEM FOR APPROVING A SUBMISSION OF INFORMATION

(71) Applicant: Accenture Global Solutions Limited, Dublin (IE)

(72) Inventors: Brian C. Christian, Eden Prairie, MN (US); Theresa M. Gaffney, Milton, MA (US); Roger D. Stones, Highlands Ranch, CO (US)

(73) Assignee: Accenture Global Solutions Limited, Dublin (IE)

( * ) Notice: Subject to any disclaimer, the term of this patent is extended or adjusted under 35 U.S.C. 154(b) by 549 days.

(21) Appl. No.: 15/445,491

(22) Filed: Feb. 28, 2017

(65) Prior Publication Data

US 2017/0255671 A1   Sep. 7, 2017

Related U.S. Application Data

(60) Provisional application No. 62/302,511, filed on Mar. 2, 2016.

(51) Int. Cl.
| | |
|---|---|
| *G06F 16/23* | (2019.01) |
| *G06Q 40/08* | (2012.01) |
| *G06F 16/25* | (2019.01) |
| *G06F 30/27* | (2020.01) |
| *G06N 20/00* | (2019.01) |

(52) U.S. Cl.
CPC ........ *G06F 16/2365* (2019.01); *G06F 16/258* (2019.01); *G06F 30/27* (2020.01); *G06N 20/00* (2019.01); *G06Q 40/08* (2013.01)

(58) Field of Classification Search
CPC .... G06F 16/951; G06F 16/958; G06F 19/328; G06F 16/35; G06F 16/2365; G06F 16/258; G06F 30/27; G06F 2221/2101; G06N 20/00
See application file for complete search history.

(56) References Cited

U.S. PATENT DOCUMENTS

| | | | |
|---|---|---|---|
| 2003/0050804 A1* | 3/2003 | Hendershot | G06Q 10/10 705/4 |
| 2014/0309756 A1* | 10/2014 | Trygstad | G06F 30/20 700/31 |
| 2017/0147928 A1* | 5/2017 | Vijayendra | G06F 11/30 |
| 2018/0040073 A1* | 2/2018 | Ghosh | G06Q 20/401 |

* cited by examiner

*Primary Examiner* — Marcin R Filipczyk
(74) *Attorney, Agent, or Firm* — Brinks Gilson & Lione

(57) ABSTRACT

A system and method approves a submission of information. The information includes field data from a data source system. The system communicates the submission to a data validation system and receives, from the data validation system, validation data that defines a validation response. The system communicates information indicative of the validation response to the data source system. The system predicts validation responses for subsequent submissions of information.

12 Claims, 4 Drawing Sheets

METHOD AND SYSTEM FOR APPROVING A SUBMISSION OF INFORMATION

RELATED APPLICATIONS

This application claims priority under 35 U.S.C. § 119(e) to U.S. Provisional Application No. 62/302,511, filed Mar. 2, 2016, the content of which is hereby incorporated by reference in its entirety.

BACKGROUND

Field

This application generally relates to information systems. In particular, this application describes a method and system for a submission of information.

Description of Related Art

Various environments exist in which a source generates a submission, which has to be approved by a validation system. For example, an insurance claim may need to be generated and sent to an insurance adjuster for validation before the claims will be paid.

Similarly, in the health care industry, a provider, such as a doctor or hospital, may be required to obtain prior approval of a procedure from an insurance company before a claim for payments can be made. The insurance company will evaluate a request for approval against internal company guidelines to determine whether to approve or deny the request.

One problem with the arrangements above is that the form of the submission or request for payment of a claim or for prior approval of a procedure can come in many different varieties. No standard exists. As such, many requests/submissions are rejected because the submission/request is missing information. This in turn results in the submission having to be corrected and resubmitted. This process may repeat until the correct information is provided. The extra process increases the time required in obtaining approval of a submission/request and necessarily results in increased cost.

BRIEF SUMMARY

In one aspect, a method for administering a single, industry-wide intake channel and approving a submission of information includes receiving, by a data analysis and exchange system and from a data source system, a submission that includes field data; communicating the submission to a data validation system; receiving, from a data validation system, validation data that defines a validation response; and communicating information indicative of the validation response to the data source system.

In a second aspect, a system for approving a submission of information includes a processor and a memory. The memory includes instruction code for causing the processor to perform acts of receiving, from a data source system, a submission that includes field data; communicating the submission to a data validation system; receiving, from a data validation system, validation data that defines a validation response; and communicating information indicative of the validation response to the data source system.

In a third aspect, a non-transitory computer readable medium for approving a submission of information includes instruction code for causing a machine to perform acts of receiving, from a data source system, a submission that includes field data; communicating the submission to a data validation system; receiving, from a data validation system, validation data that defines a validation response; and communicating information indicative of the validation response to the data source system.

DETAILED DESCRIPTION

The embodiments below describe a system that overcomes the problems discussed above. The system enforces standards and drives efficiencies through a single, industry-wide intake channel and automation of prior-authorization requests. Existing processes for prior-authorization are highly manual with multiple input types resulting in high costs and frequent authorization delays. Standardization, simplification and process optimization provided by the system yields provider and payer cost reductions, increased administrative efficiencies and improved response times.

Figure 1:
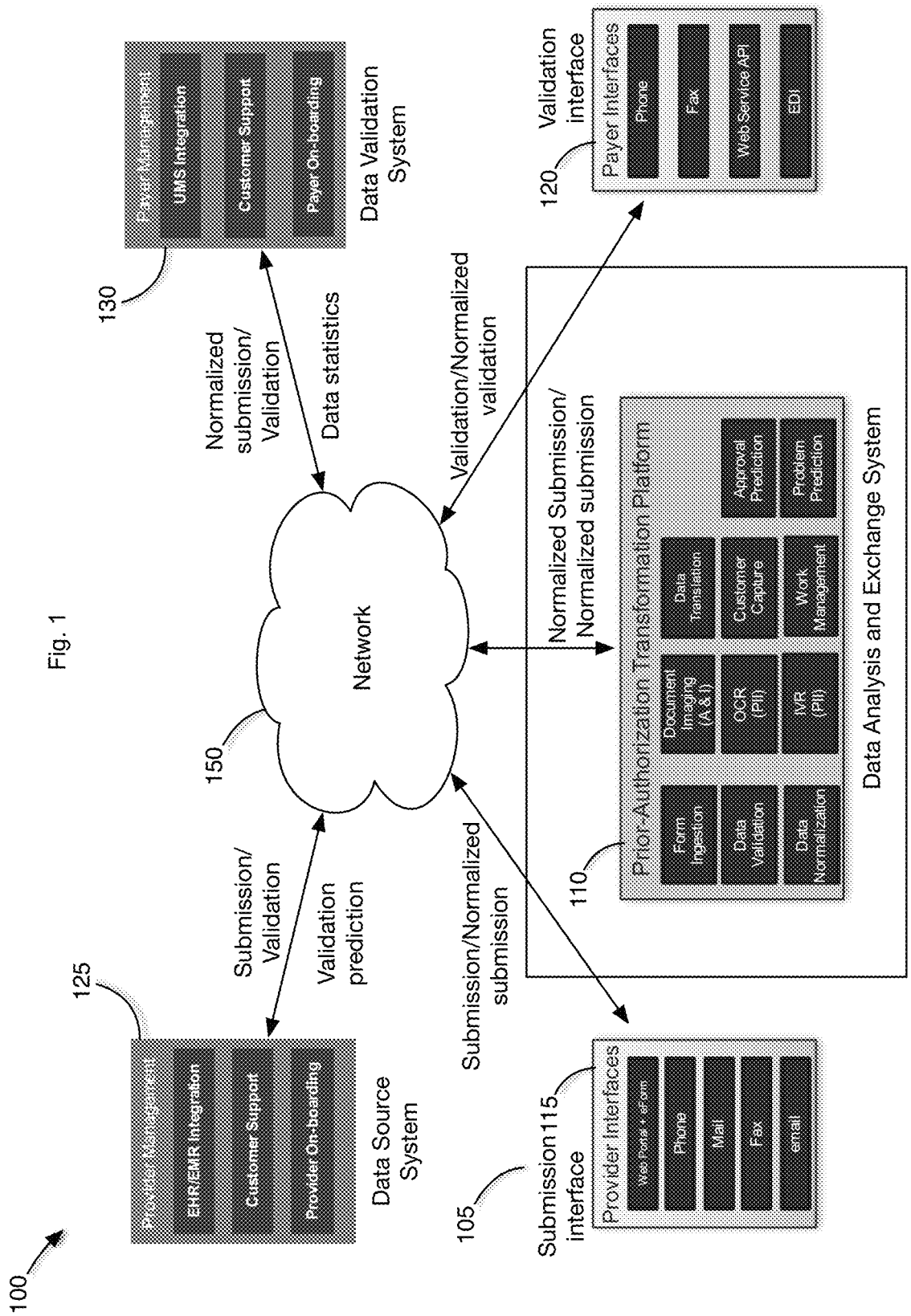
FIG. 1 illustrates an exemplary environment that includes a system for approving a submission.

FIG. 1 illustrates an exemplary environment for approving submission of information that includes a data analysis and exchange system 105, a data source system 125, and a data validation system 130.

In one exemplary implementation, the data source system 125 may correspond to a system provided by a health care provider, such as a billing system in a doctor's office or hospital. The validation system 130 may correspond to a system provided by a health insurance company.

The data analysis and exchange system 105 is configured to receive submission information from the data source system 125 via a single, industry-wide intake channel, such as a form for requesting authorization of a patient procedure. The data analysis and exchange system 105 is further configured to normalize and/or convert the received submission into a standard form and then communicate the normalized submission to the data validation system 130. For example, the data analysis and exchange system 105 may be configured to convert information received from major electronic health and medical record (EHR/EMR) platforms such as those that utilize legacy communication protocols (e.g., HL7), Infor Cloverleaf and EMRs such as Cerner and Epic.

The data analysis and exchange system 105 is further configured to received validation data from the data validation system 130 that is indicative of whether the submission was approved or denied, and to communicate the validation data or an indication of validity/approval of the submission to the data source system 125.

In some implementations, some or all of the information communicated between the data source system and the data may be routed via a submission interface 115. The submission interface 115 may be incorporated as part of the data analysis and exchange system 110 or be provided by a third party. The submission interface 115 may be utilized to convert a submission from the data source system into a form suitable for ingestion by the data analysis and exchange system 110. For example, the submission interface 115 may covert web-form data, voice data, mail data, fax data, email data, etc., into a common form to be processed by the data analysis and exchange system 110.

Likewise, in some implementations, some or all of the information communicated between the data validation system and the data may be routed via a validation interface 120. The validation interface 120 may be incorporated as part of the data analysis and exchange system 110 or be provided by a third party. The validation interface 120 may be utilized to convert validation data from the data validation system 130 into a form suitable for ingestion by the data analysis and exchange system 110.

Figure 2:
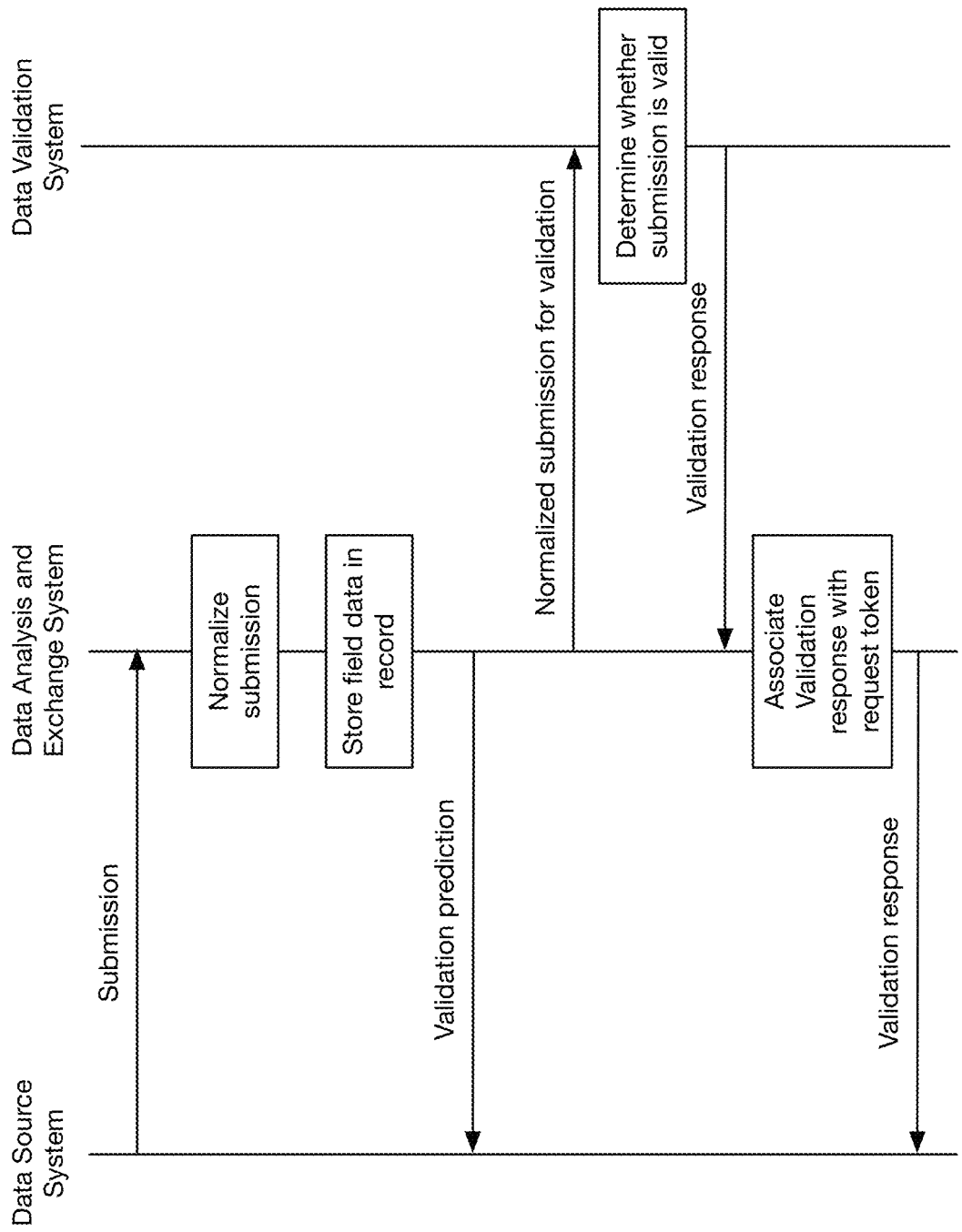
FIG. 2 illustrates a message flow sequence between a data source system, a data analysis and exchange system, and a data validation system of the exemplary environment.

FIG. 2 illustrates a message flow sequence between the data source system 125, the data analysis and exchange system 110, and the data validation system 130 of the exemplary environment 100. As illustrated, the data source system 125 communicates a submission to the data analysis and exchange system 110. The submission may come in one of a variety of formats. For example, the submission may be communicated as raw data from the data source system 125. For example, the information may have been electronically input into the data source system 125. In addition or alternatively, the submission may be made to the data analysis and exchange system 110 via voice, email, fax, etc. In this case, voice-to-text, OCR, and/or other methods may be utilized to extract the information from the communication. In the case of voice communication, integrated voice response (IVR) technology may be utilized to capture information from the requester. IVR may further facilitate provider issue routing and may further facilitate cognitive automation of various operations.

The data analysis and exchange system 110 may then normalize the submission information into a standard transaction format. For example, the information received may be normalized into an electronic data interchange (EDI) format such as an EDI format provided for by in the Health Insurance Portability and Accountability Act of 1996 (HIPAA). One such format is the EDI Health Care Services Review/Request for Review and Response (278), which is utilized to submit a request for review seeking approval to perform a medical procedure. Table 1 below illustrates and exemplary normalized 278 transaction associated with a request from a doctor to perform a procedure on a patient. Some or all of the information specified in the exemplary transaction may have been received from the data source system 125.

TABLE 2

ST*278*0001*005010X217~
Begin transaction set 278, control #0001, and implementation
convention reference is 005010X217.
BHT*0007*13*B56789*20050502*1430~
This transaction is a request using hierarchical
structure 0007 (information source, information receiver,
subscriber, dependent, event, services). The originating
system has assigned the Submitter Transaction
Identifier "B56789" along with the
transaction set creation date and time.
Loop 2000A hierarchical level identifies the insurance company.
HL*1**20*1~
HL count is 1. There is no higher, or parent, HL. This HL code is 20,
identifying the information source or the insurance company.
This HL has subordinate levels, or children.
NM1*X3*2*MARYLAND CAPITAL INSURANCE
COMPANY*****46*789312~
The request for a health service review and an admission
review is being made to Maryland Capital Insurance Company.
Their electronic transmitter identification number is 789312.

TABLE 2-continued

Loop 2000B hierarchical level identifies the submitting provider.
HL*2*1*21*1~
HL count is 2. This HL is subordinate to HL*1, the parent HL.
This HL code is 21, identifying the information receiver or the
referring provider. This HL has subordinate levels, or children.
NM1*1P*1*WATSON*SUSAN****34*98765432~
The request is being made by Susan Watson whose Social Security
Number is 98765432.
PER*IC**TE*4029993456~
Dr. Watson can be contacted by telephone at (402)999-3456.
Loop 2000C hierarchical level identifies the subscriber, who in this
case is also the patient.
HL*3*2*22*1~
HL count is 3. This HL is subordinate to HL*2, the parent HL.
This HL code is 22, identifying the subscriber. This HL
has subordinate levels, or children.
NM1*1L*1*SMITH*JOE****MI*12345678901~
The patient's name is Joe Smith; his Member Identification Number is
12345678901.
Loop 2000D hierarchical level identifies the dependent as a patient.
Because there is no dependent in this example, there is no Loop
2000D.
Loop 2000E hierarchical level identifies the patient event.
HL*4*3*EV*1~
HL count is 4. This HL is subordinate to HL*3, the parent HL.
This HL code is EV, identifying the patient event. This HL
has subordinate levels, or children.
TRN*1*97021001*9012345678~
The provider assigned the trace number of 97021001 to this patient
event request. The requester has included the user-assigned
identifier of 012345678 to this trace number.
UM*AR*I*2*21:B*****Y~
Dr. Watson is requesting an admission review for the
patient at an inpatient hospital setting.
DTP*435*D8*20050516~
Dr. Watson requests an admission date of May 16, 2005.
HI*BF:41090:D8:20050125~
The patient has been diagnosed with acute myocardial infarction;
unspecified site.
HSD*DY*7~
Dr. Watson has requested certification for a
length of stay of seven days.
CL1*2~
Dr. Watson indicates that the inpatient admission type is "urgent".
NM1*FA*2*MONTGOMERY HOSPITAL*****24*000012121~
The admitting facility is identified as Montgomery Hospital.
The Employer's Identification Number is 000012121.
N3*475 MAIN STREET~
Montgomery Hospital street address.
N4*ANYTOWN*PA*19087~
Montgomery Hospital city, state, ZIP Code.
Loop 2000F hierarchical level identifies the services. Loop 2000F
repeats for each service to be performed at Montgomery Hospital for
which authorization is requested.
HL*5*4*SS*0~
HL count is 5. This HL is subordinate to HL*4, the parent HL.
This HL code is SS, identifying the service.
This HL has no subordinate levels, or children.
UM*HS*I*2~
Dr. Watson is requesting an initial health service review for
surgery for the patient.
DTP*472*D8*20050516~
Dr. Watson is requesting permission to perform a triple bypass
venous graft (CPT) on May 16, 2005.
SV2**HC:33510~
Dr. Watson is requesting permission to perform a triple
bypass venous graft (CPT).
NM1*SJ*1*WATSON*SUSAN****34*987654321~
The service provider, the surgeon, is identified as Susan Watson.
Her Social Security Number is 987654321.
PRV*PE*PXC*203BS0133X~
This segment identifies Dr. Watson's specialty, thoracic
cardiovascular surgery.
SE*26*0001~
Number of segments, control number.

The data analysis and exchange system 110 may then store field data (e.g., information from Table 2) from the normalized submission/standard form to a record in a database. In this regard, the data stored may be scrubbed to remove or encrypt confidential fields, such as a patient's name, social security number, address, etc.

The data analysis and exchange system 110 may then communicate the normalized submission to the data validation system 130.

Subsequent to sending of the normalized submission, the data analysis and exchange system 110 may receive data that defines a validation response associated with the normalized submission from the data validation system 130. Table 2 illustrates an exemplary 278 response to the request for review of Table 1.

TABLE 2

ST*278*0001*005010X217~
Begin transaction set 278, control #0001, and the
implementation convention reference is 005010X217.
BHT*0007*11*B56789*20050502*1431*18~
This transaction is a response using hierarchical
structure 0007 (information source, information
receiver, subscriber, dependent, event, services).
The UMO's system returns the Submitter
Transaction Identifier "B56789". The
BHT06 value of "18" indicates that
this is a response with no further updates
to follow.
Loop 2000A hierarchical level identifies
the insurance company.
HL*1**20*1~
HL count is 1. There is no higher, or parent, HL. This HL
code is 20, identifying the information source or the
insurance company. This HL has subordinate levels,
or children.
NM1*X3*2*MARYLAND CAPITAL INSURANCE
COMPANY*****46*7893122~
The response to the request for admission review and health
services review is being made by Maryland
Capital Insurance Company. Their electronic
transmitter identification number is 789312.
Loop 2000B hierarchical level identifies the
submitting provider.
HL*2*1*21*1~
HL count is 2. This HL is subordinate to HL*1, the
parent HL. This HL code is 21, identifying the
information receiver or the referring provider.
This HL has subordinate levels, or children.
NM1*1P*1*WATSON*SUSAN****34*987654~
The request is being made by Susan Watson whose
Social Security Number is 987654321.
Loop 2000C hierarchical level identifies the
subscriber, who in this case is also the patient.
HL*3*2*22*1~
HL count is 3. This HL is subordinate to
HL*2, the parent HL. This HL code
is 22, identifying the subscriber.
This HL has subordinate levels, or children.
NM1*IL*1*SMITH*JOE****MI*123456789011~
The patient's name is Joe Smith; his Member
Identification Number is 12345678901.
Loop 2000D hierarchical level identifies the
dependent as a patient. Because there is no dependent
in this example, there is no Loop 2000D.
Loop 2000E hierarchical level identifies the patient event.
HL*4*3*EV*1~
HL count is 4. This HL is subordinate to HL*3, the
parent HL. This HL code is EV, identifying the patient
event. This HL has subordinate levels, or children.
TRN*2*97021001*9012345678~
The UMO must return the trace number assigned
by the provider to aid the provider in linking this
service response to the original service request.
UM*AR*I*2*21:B~
Dr. Watson requested an admission review for the
patient at an inpatient hospital setting.
HCR*A6*AUTH0002~
Maryland Capital has approved the inpatient stay
but has approved a modification from the initial request.
DTP*435*D8*20050516~

TABLE 2-continued

Maryland Capital has approved the admission
date of May 16, 2005.
HI*BF:41090:D8:20050125~
The patient has been diagnosed with acute
myocardial infarction; unspecified site.
HSD*DY*5~
Dr. Watson requested certification for a length of
stay of seven days. The
UMO has certified a length of stay of five days.
NM1*FA*2*MONTGOMERY HOSPITAL*****24*000012121~
The admitting facility is identified as Montgomery
Hospital. The Employer's Identification Number is 000012121.
N3*475 MAIN STREET~
Montgomery Hospital street address.
N4*ANYTOWN*PA*19087~
Montgomery Hospital city, state, ZIP Code.
Loop 2000F hierarchical level identifies the services.
Loop 2000F repeats for each service to be performed
at Montgomery Hospital for which
authorization is requested.
HL*5*4*SS*0~
HL count is 5. This HL is subordinate to HL*4,
the parent HL. This HL code is SS, identifying
the service. This HL has no subordinate levels,
or children.
UM*HS*I*2~
Dr. Watson is requesting an initial health
service review for surgery for the patient.
HCR*A1*AUTH0002~
Maryland Capital Insurance Company has
approved the surgery in full and assigned the
same certification number AUTH0002.
DTP*472*D8*20050516~
Dr. Watson requested permission to perform
the procedure on May 16, 2005.
SV2**HC:33510~
Dr. Watson is requesting permission to perform a
triple bypass venous graft (CPT).
NM1*SJ*1*WATSON*SUSAN****34*987654321~
The service provider, the surgeon, is identified
as Susan Watson. Her Social Security Number
is 987654321.
PRV*PE*PXC*203BS0133X~
This segment identifies Dr. Watson's specialty,
thoracic cardiovascular surgery.
SE*26*0001~
Number of segments, control number.

In the exemplary response, field HCR*A1*AUTH0002~ indicates that the requested procedure has been approved Data associated with the validation response or an indication of validity/approval may be stored to the record in the database where the submission field data is stored.

The data analysis and exchange system 110 may then communicate the validation response or an indication of validity/approval to the data source system 125.

Figure 3:
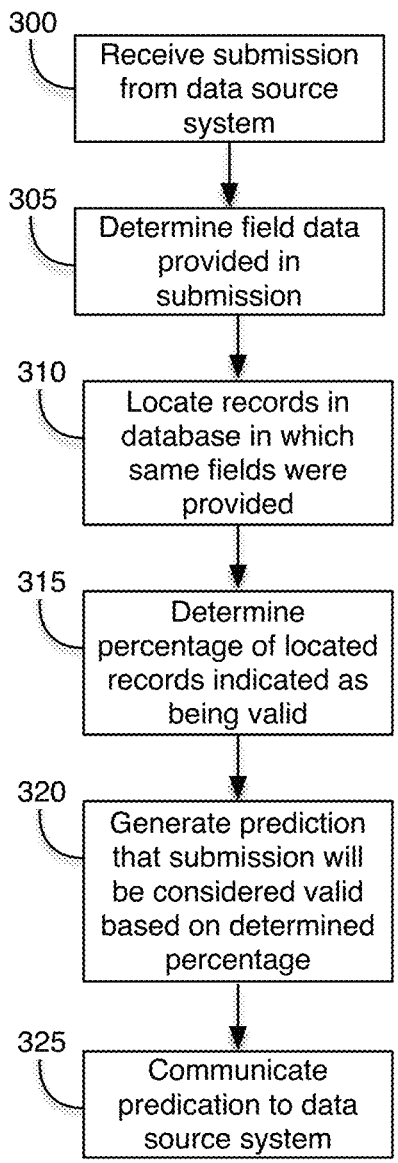
FIG. 3 illustrates exemplary operations that may be performed by the data analysis and exchange system in generating a validity prediction associated with a submission received from the data source system.

FIG. 3 illustrates exemplary operations that may be performed by the data analysis and exchange system 110 in generating a validity prediction associated with a submission received from the data source system. In this regard, the operations may be implemented via instruction code stored in non-transitory computer readable media that resides within the data analysis and exchange system 110 configured to cause the data analysis and exchange system 110 to perform the operations in the figures.

At block 300, a new submission may be received from a data source 125. The submission may come in one of a variety of formats. For example, the submission may be communicated as raw data from the data source system 125. For example, the information may have been electronically input into the data source system 125. In addition or alternatively, the submission may be made to the data analysis and exchange system 110 via voice, email, fax, etc. In this case, voice-to-text, OCR, and/or other methods may be utilized to extract the information from the communication. In the case of voice communication, integrated voice response (IVR) technology may be utilized to capture information from the requestor.

At block 305, the data analysis and exchange system 110 may determine the fields that are provided in the submission. The submission may have been previously normalized. For example, information for all the fields specified in Table 1 may have been provided. Or a subset of the fields may have been specified.

At block 310, the data analysis and exchange system 110 may locate records in the database associated with prior submissions for which a similar combination of fields were provided.

At block 315, the data analysis and exchange system 110 may determine the percentage of located records that were determined to be valid/approved by the data validation system. For example, for each located record, the data analysis and exchange system 110 may analyze the corresponding response information, such as the information provided in Table 1, to determine whether the requested procedure was approved, or if rejected, the reason for the rejection. For example, HCR*A1*AUTH0002~ of Table 1 may indicate a reason for denying the request. Alternatively, a different field may be specified for providing a reason for denying the request.

At block 320, a predication that the new submission will be considered valid/approved may be generated. For example, machine learning algorithms utilizing R, Hadoop/MapReduce, and/or different algorithms may be utilized to determine a trend associated between request, approvals of the request, and rejections of the request based on different combinations of fields provided by the data source system 125. This information is utilized to form a prediction. For example, the algorithms may determine a 90% rejection rate when the patients address is omitted, whereas a rejection rate of 10% may be determined when an admission type (e.g., CL1*2~ indicating an admission type of urgency) is missing.

At block 325, the predication may be communicated to the data source system 125.

The operations of FIG. 3 may be performed in real-time. This in turn allows an operator at the data source system such as the billing staff at a provider to quickly receive an indication of whether a submission or request for authorization of a procedure will be approved. In cases where the probability of approval is low, the data analysis and exchange system 110 may indicate which additional types of information are required to increase the probability of approval. For example, following the example above, the data analysis and exchange system may determine that providing the patient address will increases that chances of approval significantly, or that submission of lab tests such as x-rays, blood work results, etc. may increase the chances of approval by, for example, 90%. The provider may then obtain the additional information and include the information in the submission.

Figure 4:
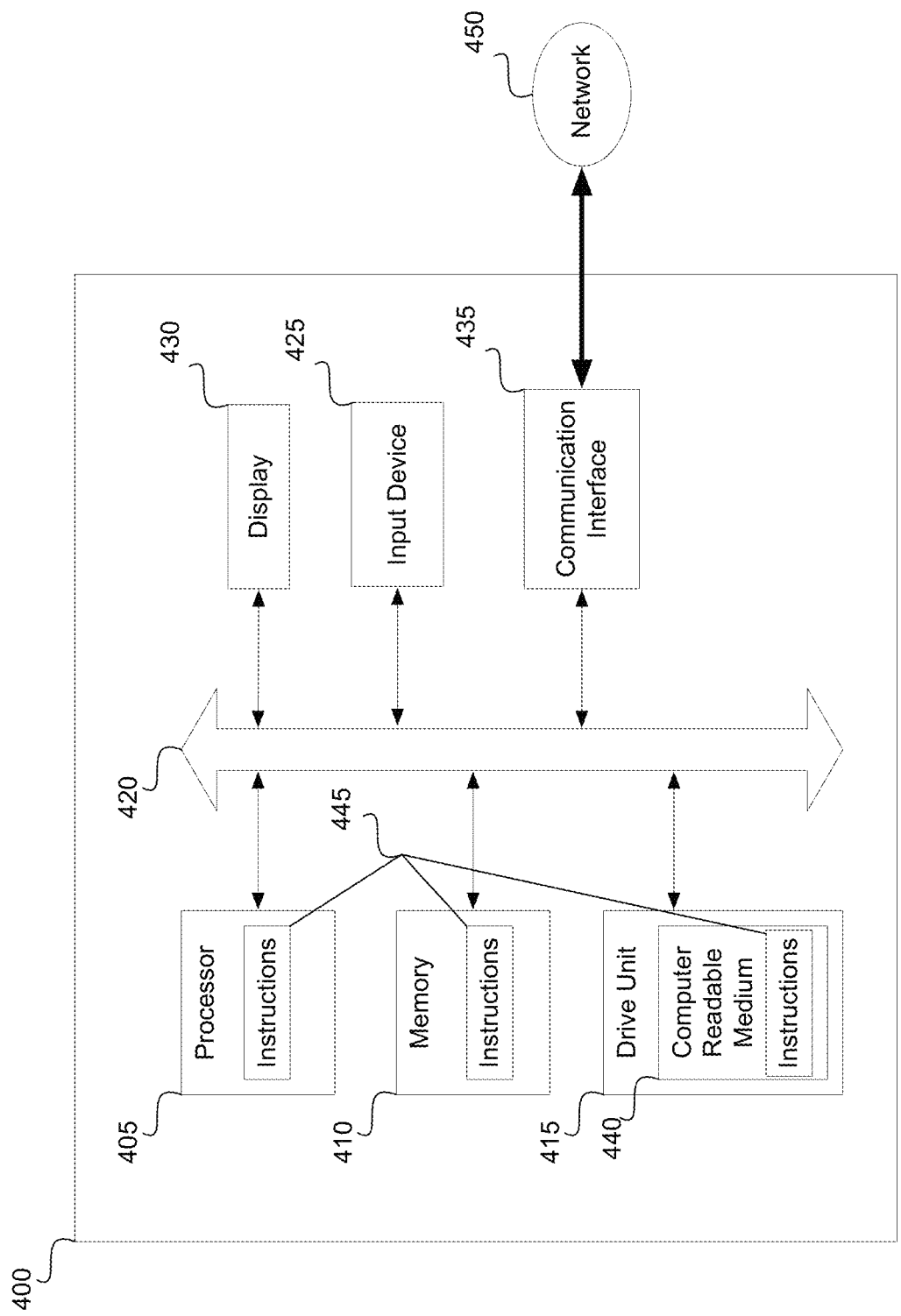
FIG. 4 illustrates a computer system that may correspond to one or more subsystems of the system.

FIG. 4 illustrates a computer system 400 that may form part of or implement the systems described above. The computer system 400 may include a set of instructions 445 that the processor 405 may execute to cause the computer system 400 to perform any of the operations described above. The computer system 400 may operate as a stand-alone device or may be connected, e.g., using a network, to other computer systems or peripheral devices.

In a networked deployment, the computer system 400 may operate in the capacity of a server or as a client-user computer in a server-client user network environment, or as a peer computer system in a peer-to-peer (or distributed) network environment. The computer system 400 may also be implemented as or incorporated into various devices, such as a personal computer or a mobile device, capable of executing the instructions 445 (sequential or otherwise) that specify actions to be taken by that machine. Further, each of the systems described may include any collection of sub-systems that individually or jointly execute a set, or multiple sets, of instructions to perform one or more computer functions.

The computer system 400 may include one or more memory devices 410 on a bus 420 for communicating information. In addition, code operable to cause the computer system to perform any of the operations described above may be stored in the memory 410. The memory 410 may be a random-access memory, read-only memory, programmable memory, hard disk drive or any other type of memory or storage device.

The computer system 400 may include a display 430, such as a liquid crystal display (LCD), a cathode ray tube (CRT), or any other display suitable for conveying information. The display 430 may act as an interface for the user to see the functioning of the processor 405, or specifically as an interface with the software stored in the memory 410 or in the drive unit 415.

Additionally, the computer system 400 may include an input device 425, such as a keyboard or mouse, configured to allow a user to interact with any of the components of system 400.

The computer system 400 may also include a disk or optical drive unit 415. The disk drive unit 415 may include a computer-readable medium 440 in which the instructions 445 may be stored. The instructions 445 may reside completely, or at least partially, within the memory 410 and/or within the processor 405 during execution by the computer system 400. The memory 410 and the processor 405 also may include computer-readable media as discussed above.

The computer system 400 may include a communication interface 435 to support communications via a network 450. The network 450 may include wired networks, wireless networks, or combinations thereof. The communication interface 435 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for approving a submission of information comprising:
   receiving, by a data analysis and exchange system and from a data source system, a first submission that includes field data;
   in response to receiving the submission, normalizing, by the data analysis and exchange system, the first submission into a standard format when the first submission is provided in a plurality of formats;
   in response to normalizing the submission, storing, to a database, the field data associated with the first submission;
   in response to storing the field data, removing or encrypting a confidential field included in the field data;
   in response to removing or encrypting the confidential field, communicating, by the data analysis and exchange system, the normalized first submission to a data validation system;
   in response to communicating the normalized first submission, receiving, from the data validation system, validation data that defines a validation response associated with the normalized first submission;
   in response to receiving the validation data, storing, to the database, the validation data;
   in response to storing the validation data, matching, by the data analysis and exchange system, the validation response with the first submission;
   in response to matching the validation response, communicating, by the data analysis and exchange system, information indicative of the validation response to the data source system;
   receiving a second submission from the data source system;
   in response to receiving the second submission, determining a first correlation between the second submission and a validation of the second submission, and a second correlation between the second submission and an invalidation of the second submission by a machine learning algorithm utilizing different combinations of the field data;
   generating a prediction as to whether the second submission will be determined to be valid based on the first correlation and the second correlation;
   communicating the prediction to the data source system;
   determining the prediction is below a predetermined threshold; and
   in response thereto, identifying additional field data based on the first correlation and the second correlation for the second submission to increase the prediction that the second submission will be determined to be valid.

2. The method according to claim 1, wherein the format of the validation data from the data validation system is provided in one of the plurality of formats, wherein the method further comprises converting the received validation data into the standard format prior to communicating the validation data to the data source system.

3. The method according to claim 2, wherein the format is one of a fax format, mail format, email format, voice format, or a web portal format.

4. The method according to claim 1, wherein generating the prediction as to whether the second submission will be determined to be valid comprises:
   determining the field data provided in the second submission;
   locating records in the database in which the same fields were provided;
   determining a percentage of located records as being valid; and
   generating the prediction based on the determined percentage.

5. A system for approving a submission of information comprising:
   a hardware processor; and
   a memory, wherein the memory includes instruction code for causing the processor to perform acts of:
      receiving, from a data source system, a first submission that includes field data;
      in response to receiving the submission, normalizing the first submission into a standard format when the first submission is provided in a plurality of formats;
      in response to normalizing the submission, storing, to a database, the field data associated with the first submission;
      in response to storing the field data, removing or encrypting a confidential field included in the field data;
      in response to removing or encrypting the confidential field, communicating the normalized first submission to a data validation system;
      in response to communicating the normalized first submission, receiving, from the data validation system, validation data that defines a validation response associated with the normalized first submission;
      in response to receiving the validation data, storing, to the database, the validation data;
      in response to storing the validation data, matching, by the data analysis and exchange system, the validation response with the first submission;
      in response to matching the validation response, communicating information indicative of the validation response to the data source system;
      receiving a second submission from the data source system;
      in response to receiving the second submission, determining a first correlation between the second submission and a validation of the second submission, and a second correlation between the second submission and an invalidation of the second submission by a machine learning algorithm utilizing different combinations of the field data;
      generating a prediction as to whether the second submission will be determined to be valid based on the first correlation and the second correlation;
      communicating the prediction to the data source system;
      determining the prediction is below a predetermined threshold; and
      in response thereto, identifying additional field data based on the first correlation and the second correlation for the second submission to increase the prediction that the second submission will be determined to be valid.

6. The system according to claim 5, wherein the format of the validation data from the data validation system is provided in one of the plurality of formats, wherein the instruction code causes the processor to perform the act of converting the received validation data into the standard format prior to communicating the validation data to the data source system.

7. The system according to claim 6, wherein the format is one of a fax format, mail format, email format, voice format, or a web portal format.

8. The system according to claim 5, wherein the act of generating a prediction as to whether the second submission will be determined to be valid comprises:
    determining the field data provided in the second submission;
    locating records in the database in which the same fields were provided;
    determining a percentage of located records as being valid; and
    generating the prediction based on the determined percentage.

9. A non-transitory computer readable medium having instruction code stored therein for approving a submission of information, the instruction code being executable by a machine for causing the machine to perform acts comprising:
    receiving, from a data source system, a first submission that includes field data;
    in response to receiving the submission, normalizing the first submission into a standard format when the first submission is provided in a plurality of formats;
    in response to normalizing the submission, storing, to a database, the field data associated with the first submission;
    in response to storing the field data, removing or encrypting a confidential field included in the field data;
    in response to removing or encrypting the confidential field, communicating the normalized first submission to a data validation system;
    in response to communicating the normalized first submission, receiving, from the data validation system, validation data that defines a validation response associated with the normalized first submission;
    in response to receiving the validation data, storing, to the database, the validation data;
    in response to storing the validation data, matching, by the data analysis and exchange system, the validation response with the first submission;
    in response to matching the validation response, communicating information indicative of the validation response to the data source system;
    receiving a second submission from the data source system;
    in response to receiving the second submission, determining a first correlation between the second submission and a validation of the second submission, and a second correlation between the second submission and an invalidation of the second submission by a machine learning algorithm utilizing different combinations of the field data;
    generating a prediction as to whether the second submission will be determined to be valid based on the first correlation and the second correlation;
    communicating the prediction to the data source system;
    determining the prediction is below a predetermined threshold; and
    in response thereto, identifying additional field data based on the first correlation and the second correlation for the second submission to increase the prediction that the second submission will be determined to be valid.

10. The non-transitory computer readable medium according to claim 9, wherein the format of the validation data from the data validation system is provided in one of the plurality of formats, wherein the instruction code causes the machine to perform the act of converting the received validation data into the standard format prior to communicating the validation data to the data source system.

11. The non-transitory computer readable medium according to claim 10, wherein the format is one of a fax format, mail format, email format, voice format, or a web portal format.

12. The non-transitory computer readable medium according to claim 9, wherein the act of generating a prediction as to whether the second submission will be determined to be valid comprises:
    determining the field data provided in the second submission;
    locating records in the database in which the same fields were provided;
    determining a percentage of located records as being valid; and
    generating the prediction based on the determined percentage.

* * * * *